INVENTOR
WAYNE B. STONE, JR.

BY

ATTORNEY

INVENTOR
WAYNE B. STONE, JR.

INVENTOR
WAYNE B. STONE, JR.

BY

ATTORNEY

United States Patent Office 3,440,782
Patented Apr. 29, 1969

3,440,782
AUTOMOTIVE SUPPORT STRUCTURE FOR INCREASING THE CAPACITY OF PARKING LOTS
Wayne B. Stone, Jr., Kensington, Md., assignor of twenty-four and one-half percent each to Turner G. Moller, Lanham, and Edward L. Goldman, Bowie, Md.
Filed Apr. 4, 1967, Ser. No. 628,491
Int. Cl. E04h 6/38; B65g 11/18
U.S. Cl. 52—175
35 Claims

ABSTRACT OF THE DISCLOSURE

This invention relates to an automotive support structure including inclined ramp means over which an automobile may be driven to an elevated parking position after which time the ramp means are moved transversely of the automotive path of movement to permit a second automobile to be driven directly beneath the first automobile. The members providing support for the elevated automobile are transversely spaced a distance sufficient to accommodate the lower automobile. In one form of the invention, the inclined ramp means are provided with upwardly directed portions which permit the linear length of the ramps to be less than that required in the case of planar ramps. Another form of the invention involves the use of pivotally related plural ramp portions to effectively shorten the linear length of the overall ramp structure.

*Background of the invention*

There are many areas of business, such as parking lots, service stations and automobile agencies where it is necessary to park or store automobiles for various periods of time and in which the space available for this purpose is limited.

Prior attempts to increase the parking capacity of a given area have, in general involved the use of parking buildings which require a large capital outlay and may not be feasible for small businesses.

Other efforts have been made to produce single unit devices to support an automobile approximately six feet off the ground whereby a second automobile may be parked directly thereunder.

Examples of the prior art involving movement of an approach ramp to an out of the way position whereby additional cars may be parked beneath an elevated car appear in U.S. Patents 1,987,376 and 2,815,872 as well as in Italian Patent 365,982. The risks inherent in permitting an elevated car to undergo angular movement, as in these patent disclosures, as well as the unusually large power requirements which would be necessary to elevate the approach ramps shown in the above patents by means other than using a car to counterbalance the same are obvious deterrents to commercial acceptance. Although it has long been the practice to provide elevated ramp structures pivotally mounted within the confines of a mobile car carrier for pivotal movement about an elevated generally horizontal axis, as in U.S. Patents 1,809,557; 2,096,455; 2,461,927; 2,492,980 and 2,730,400, it has not been previously suggested that ramps extending upwardly from a lower parking level to an elevated parking level might be pivoted on longitudinal inclined axes in order to clear the way for additional cars to be parked beneath an elevated car and between the support structures on which the inclined ramps are mounted. The relatively short lever arms involved in ramps of the type herein disclosed permit the same to be moved into and out of the path of automotive movement manually, or by small compact power units.

*Summary of the invention*

It is an object of this invention to provide a support structure having an elevated parking level upon which an automobile may be driven under its own power while preserving the original parking area on which the support structure is positioned for the parking of additional automobiles. It is a further object to so configure the ramp means over which an automobile is driven to reach an elevated parking level that the length of the same, measured along a straight line, may be materially reduced while yet avoiding engagement of the automobile undercarriage with the ramp structure or the lower parking level on which it is supported. Another object, in one form of the invention, is to pivot a plurality of ramps to a static support structure in such a manner that they form a virtually planar approach surface in a first position and are movable, automatically, to a second angularly related position by means of which movement the effective overall length of the upper parking level is increased.

*Brief description of the drawings*

In the drawings.

Similar reference characters have been used to refer to corresponding parts of the various embodiments herein disclosed.

Description of the preferred embodiments

Figures 1, 2, 3, 4:
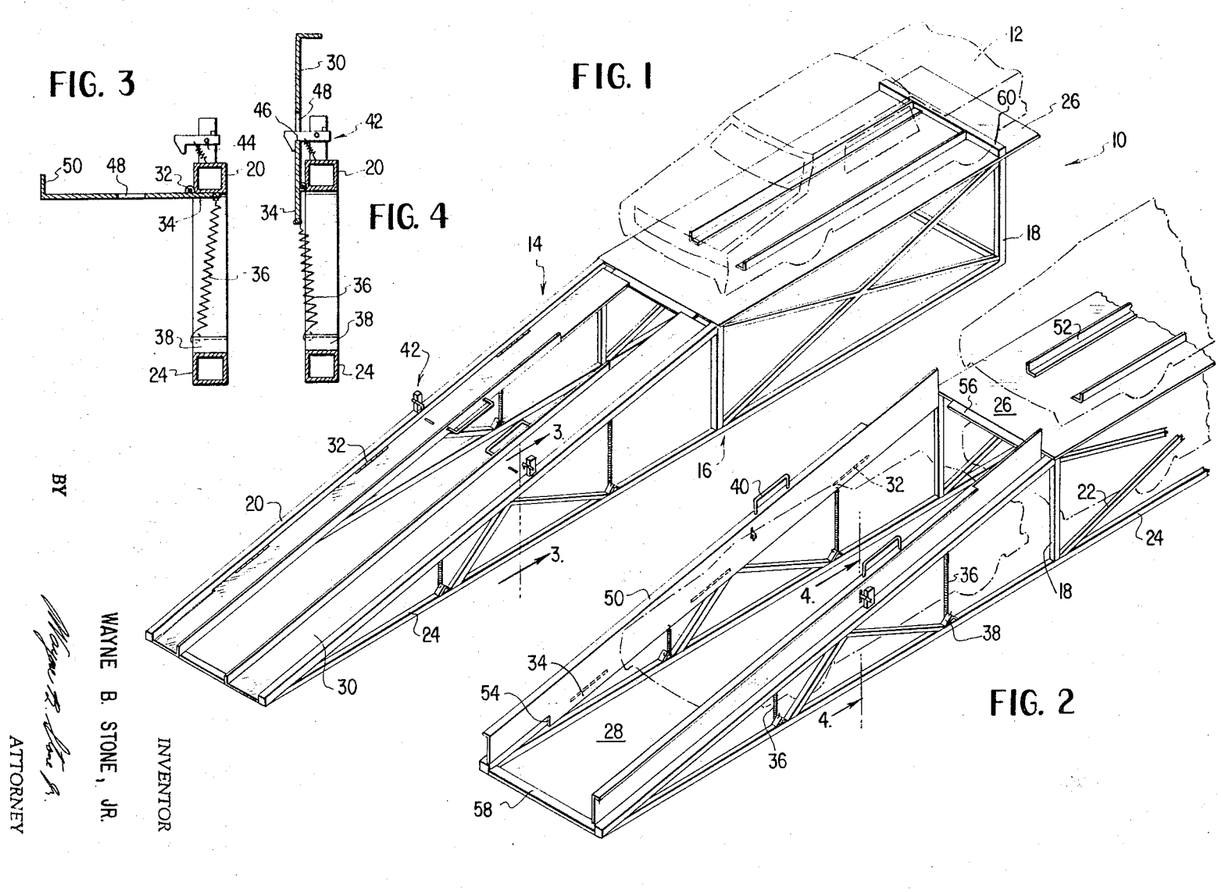
FIGURE 1 is a perspective view of one form of the automotive support structure showing an automobile on an elevated parking level.
FIGURE 2 is a similar view of the support structure showing the inclined ramps swung to one side to accommodate two additional automobiles within the lateral confines of the support structure.
FIGURE 3 is a sectional view taken on the line 3—3 of FIGURE 1.
FIGURE 4 is a sectional view taken on the line 4—4 of FIGURE 2.

One form of the automotive support structure 10 is shown in FIGURES 1 and 2 supporting an automobile 12. Transversely spaced support means 14, 16, including upright and inclined members 18, 20 having appropriate bracing 22, extend upwardly from a lower base support level 24 to support an upper parking level or platform 26 approximately six feet above conventional parking level 28. The transverse spacing between support means 14 and 16 exceeds the width of an automobile to define a path of automotive movement therebetween extending beneath upper level 26.

A pair of inclined ramps 30 are pivotally mounted on inclined members 20 for pivotal movement about inclined longitudinal axes, defined by pivots 32 adjacent the outer lateral edge of each inclined ramp, between the positions shown in FIGURES 1 and 2. In FIGURE 1, ramps 30 are shown in their lower load supporting position providing an inclined path of automotive wheel travel between levels 24 and 26 which intersects a portion of the automotive path of movement defined between support means 14, 16. A plurality of ramp extensions 34 which may be formed integrally with ramps 30 or rigidly affixed thereto, as by welding, extend laterally outward of the longitudinal axis defined by pivots 32 and engage the undersurface of inclined members 20 when ramps 30 are in the lower position shown in FIGURES 1 and 3. Tension springs 36 are interconnected between extensions 34 and suitable anchors 38 on base support 24 to bias ramps 30 about their pivots 32 toward the raised position shown in FIGURES 2 and 4. The counterbalancing effect of springs 36 is so selected as to permit ramps 30 to be raised, manually, to the position shown in FIGURES 2 and 4 by exerting an upward force on handles 40.

In order to lock ramps 30 in their raised position of FIGURE 2, spring loaded latches 42 are mounted on inclined members 20 in such position as to be cammed upwardly about pivots 44 by the outer lateral edges 46 of openings 48 formed in ramps 30 to receive the locking latches.

Figure 6:
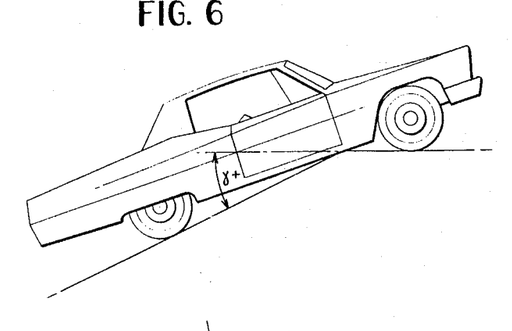

The inner lateral edges of ramps 30 and the upper surface of level 26 are provided with upstanding wheel guide flanges 50, 52 which are interrupted adjacent the intersection of ramps 30 and upper surface 26 to avoid engagement with the car undercarriage as will be more apparent from the following description of FIGURE 6. It will be noted that ramp extensions 34 terminate at a point 54 spaced a sufficient distance above level 24 to avoid engagement with either lower support level 24 or parking level 28 when the ramps are pivoted between the positions shown in FIGURES 1 and 2. The ramps 30 are supported at their upper and lower ends, in the load supporting position of FIGURE 1, by cross supports 56, 58, which may be respectively integral with upper and lower levels 26, 24, in addition to the support provided by the engagement of extensions 34 with the undersurfaces of inclined members 20 as shown in FIGURE 3. Where support structure 10 is to be used on a level lot, brace 58 could be omitted and the lower ends of ramps 30 permitted to rest directly on lower parking level 28, if desired.

In use, the automotive support structure 10 is positioned on a parking level 28, such as a parking lot. With ramps 30 in the lower position shown in FIGURE 1 an automobile 12 is then driven up the ramps and comes to rest on upper level 26 against wheel stop 60. After the operator has descended from the upper parking level, such as by walking down one of the ramps 30, he then grasps handles 40 and lifts the ramps upwardly to the position shown in FIGURES 2 and 4 whereupon the outer lateral edges 46 of openings 48 in ramps 30 cam aside locking latches 42 prior to their engagement with the ramps as shown in FIGURE 4 to lock the ramps in raised position. After the ramps are raised to the position of FIGURE 2, it is apparent that they no longer lie within the path of automotive movement defined between support means 14, 16 and a second automobile may be driven between the support means, on level 28, and parked beneath automobile 12. A third car may then be parked between inclined members 20, as indicated in phantom lines in FIGURE 2. It is obvious that, where space permits, upper level 26 could be extended in length to park any desired number of automobiles. In order to get automobile 12 down it is necessary to move the automobile parked between inclined supports 20. The operator then manually releases locking latches 42, lowers the ramps to their lower position of FIGURE 1, ascends one of the ramps 30 and drives automobile 12 down the ramps.

It will be noted from an inspection of FIGURE 2 that the length of support structure 10 exceeds the length of the two cars illustrated in phantom lines parked on lower level 28. In many parking facilities it is desirable to confine the overall length of an automotive support structure to two car lengths. In such instances, it is not feasible to use the particular ramp structure shown in FIGURES 1 and 2 because the ramp incline would, necessarily, be too steep to accommodate all makes of automobiles.

Figure 5:
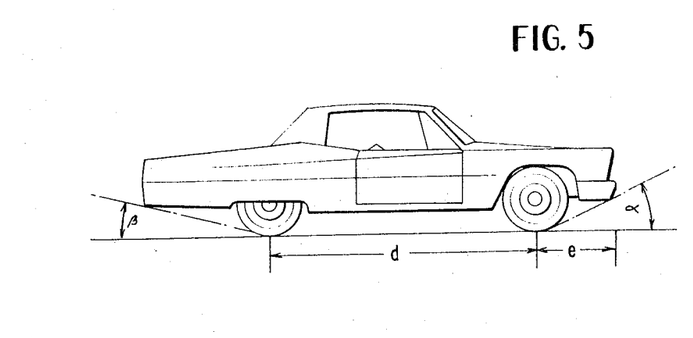
FIGURES 5 and 6 are schematic illustrations of various permissible angles which portions of an automobile may assume with respect to horizontal and inclined planes.

The problems encountered in designing an automotive support structure whose overall length does not exceed two car lengths will be more apparent from an inspection of FIGURES 5 and 6 which depict, schematically, the critical angles which must be considered in the design of a parking facility utilizing drive-on inclined ramps. In these figures, angle $\alpha$ represents the approach angle, angle $\beta$ the departure angle, and angle $\gamma$ the ramp break-over angle, which angles are different for various makes of cars. Angle $\alpha$ represents, for a particular car, the angle of the greatest incline which may be approached without dragging the front bumper on the incline while angle $\beta$ represents the greatest angle permissible to avoid dragging a portion of the rear undercarriage on the lower parking level due to the upward inclination of the front end of the automobile. The break-over angle $\gamma$ refers to the greatest permissible angle which may be permitted between the inclined ramp and upper parking level to avoid dragging the mid-portion of the automobile undercarriage when the front wheels of the automobile are on the upper level and the rear wheels are traversing the inclined ramp as shown in FIGURE 6. In FIGURE 6, the angle $\gamma$ is shown as having been exceeded and is designated by angle $\gamma+$.

Figure 7:
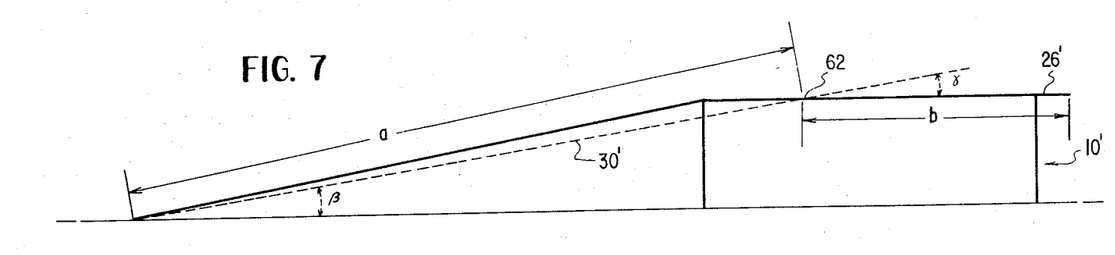
FIGURES 7 and 8 are schematic representations, respectively, of planar and curved ramp structures approaching an upper level.
Figure 8:
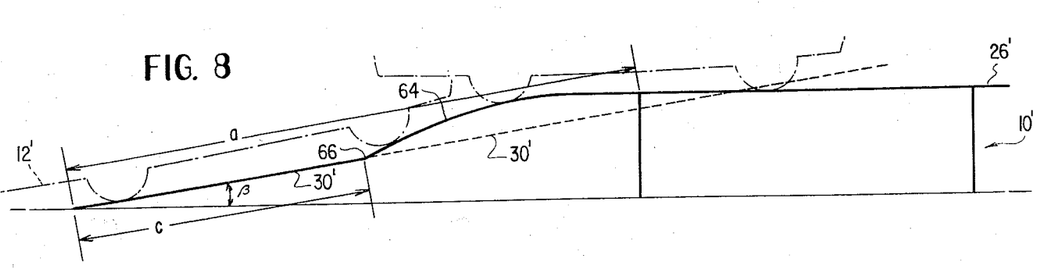

Through the use of a ramp structure, configured in the manner schematically illustrated in FIGURE 8, it is possible for a car to be driven from a lower to an upper parking level without exceeding the angles previously referred to even though the linear distance $a$ of the ramp structure is less than that of the planar ramps shown in FIGURES 1 and 2 which is schematically illustrated by the inclined planar ramps 30' in FIGURES 7 and 8.

When the overall length of support structure 10' is limited to two car lengths, as illustrated in FIGURES 7 and 8, and the upper parking level 26' is made as short as possible, i.e., slightly in excess of the wheelbase length $d$ and front overhang $e$, depicted in FIGURE 5, of the class of cars to be supported thereon, the departure and break-over angles for many cars are exceeded by the planar ramp structure shown in solid lines in FIGURE 7. The ramp structure shown in phantom lines in FIGURE 7 represents the maximum permissible ramp inclination for most automobiles and this ramp structure intersects upper level 26' at a point 62 spaced a distance $b$ from the end of upper level 26' which is less than that distance necessary to support the desired class of cars having wheelbase $d$ and front overhang $e$.

The utilization of the full length of upper level 26' shown in FIGURES 7 and 8, is made possible by the provision of a portion 64 extending upwardly and then downwardly relative to the plane of ramp portion 30'. The initial upwardly inclined portion 66 of curved portion 64 is spaced a distance $c$ from the lower end of ramp 30'. The distance $c$ exceeds the length of a car wheelbase $d$ so that when the front wheels of the car 12' engage upwardly inclined portion 66, the rear wheels are already concurrently moving upwardly on the lower end of ramp 30', as illustrated in the lower phantom line position of FIGURE 8, so that the additional upward inclination of the car due to the front wheels moving up inclined portion 66 does not cause the rear bumper to drag. Similarly, as the front wheels move further along portion 64 toward upper level 26', the rear wheels reach the inclined portion 66 and as the front wheels move forward along upper level 26' the rear wheels move upwardly along portion 64 so that the critical break-over angle is not exceeded as shown in the upper phantom position in FIGURE 8. In most instances the elevational configuration of portion 64 will not be a smooth curve but is flattened somewhat to avoid engagement with the car undercarriage as the car moves between the phantom position shown in FIGURE 8.

Figures 9, 10:
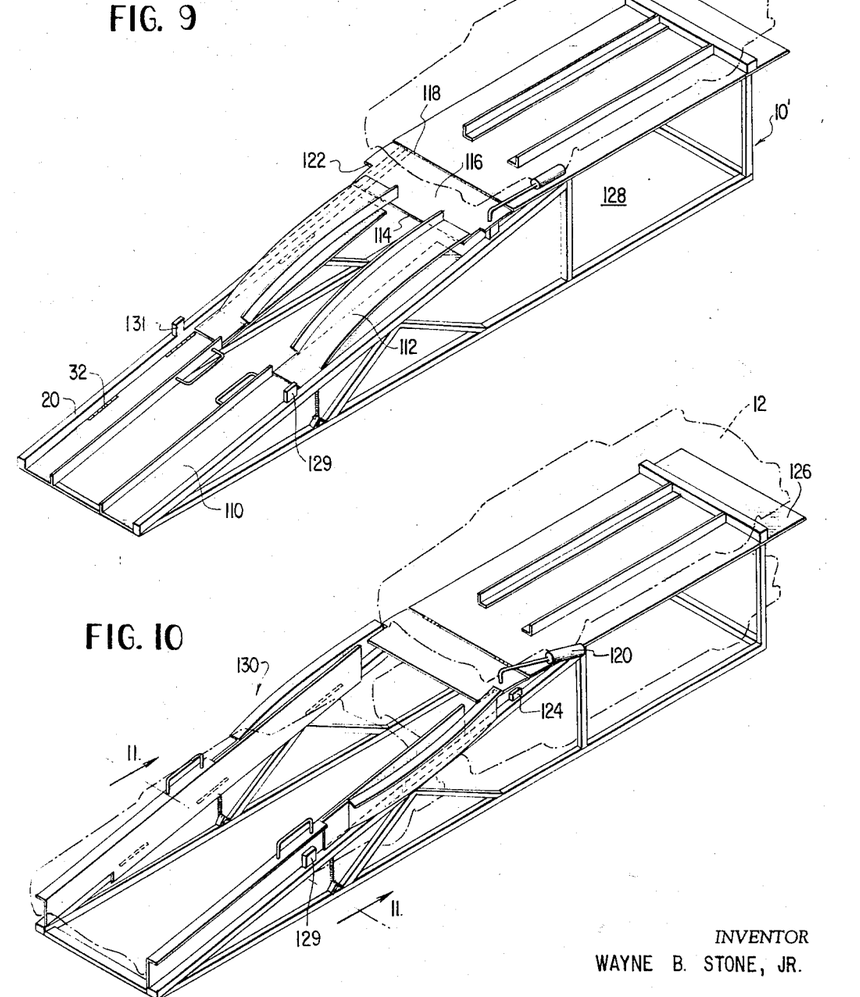
FIGURE 9 is a perspectivie view of a modified form of the invention with the ramps in a lower load-supporting position.
FIGURE 10 is a view similar to FIGURE 9 in which the ramps are positioned to accommodate additional automobiles, as in FIGURE 2.
Figure 11:
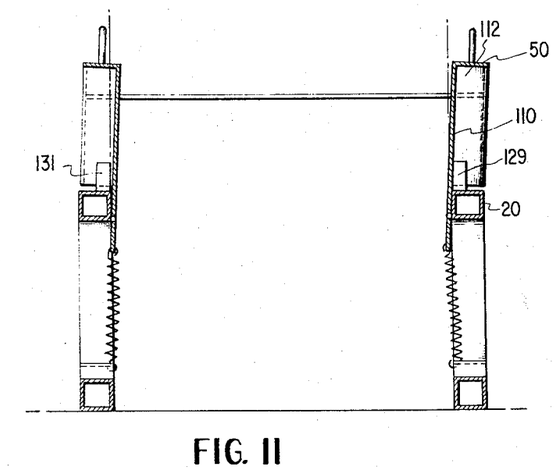
FIGURE 11 is a sectional view taken along line 11—11 of FIGURE 10.

A practical utilization of the support structure schematically illustrated in FIGURE 8 is shown in FIGURES 9 and 10 which correspond, generally, to the embodiment shown in FIGURES 1 and 2 except for the incorporation of curved ramp portion 64 shown in FIGURE 8. The vertical spacing between the upper and lower parking levels in FIGURES 7–10 corresponds to that in FIGURES 1 and 2 and provides adequate vertical clearance for all makes of cars. In most instances this vertical spacing will permit an operator to walk upright beneath the upper level when entering and leaving a car parked beneath the upper level.

In FIGURES 9 and 10 it will be noted that due to the use of a shortened upper level 126, the rear portion of the elevated automobile 12 extends rearwardly beyond upper level 126. In order to prevent any possible leakage from car 12 onto those parked thereunder and to provide a means of supporting the ramps in their upper position other than the latching device shown in FIGURES 3 and 4 while still maintaining adequate clearance with the rear portion of elevated automobile 12 to permit the ramps to be pivoted about their longitudinal inclined axes, the ramps 130 extending between upper and lower levels 126, 128 are made in two parts. Lower ramp portions 110, which include upwardly curved extensions 112 secured thereto, are configured to form a part of the curved portion 64 shown in FIGURE 8, and are pivotally mounted on inclined members 20 for pivotal movement about pivots 32 generally in the manner described in connection with FIGURES 1 and 2. The curved upper end portions 112 of lower ramp portions 110 overlie the rear edge 114 of an upper ramp portion 116 which is pivotally mounted on a transverse axis defined by pivots 118 adjacent the rear edge of upper level 126. Upper ramp portion 116 is configured to cooperate with curved extensions 112 in their respective lowered load carrying positions as shown in FIGURE 9, to define the curved portion 64, shown in FIGURE 8.

Counter weight 120, rigidly connected with upper ramp 116 and located on the opposite side of pivot axis 118, is sufficiently heavy to move upper ramp 116 to its raised, substantially horizontal, position shown in FIGURE 10 but is not sufficiently heavy to overcome the additional weight applied to upper ramp 116 by one of the lower ramps 110 and its extension 112 resting on edge 114. Upper ramp 116 is cutaway at 122 to provide clearance for lower ramps 110 to pivot to their raised position. Stops 124 are secured to inclined supports 20 to limit downward movement of ramp 116 to the position shown in FIGURE 9. In the embodiment shown in FIGURES 9 and 10, stop 129 cooperates with right lower ramp 110 to allow the same to pivot just over-center prior to abutting the stop so that there is no tendency for the ramp to fall to the lower position by gravity. Left lower ramp 110 abuts its stop 131 just before reaching a vertical position and tends to return to the lower load supporting position by gravity.

After an automobile is driven over ramps 130 and 116 onto upper level 126 and the operator has descended, the right lower ramp 110 is first swung to its overcenter position. Thereafter, left lower ramp 110 is manually raised to its position of abutment against stop 131, just short of a vertical position. Upper ramp 116 then swings upwardly out of the path of automotive movement to a generally horizontal position about pivot axis 118 under the influence of counter weight 120. Due to the fact that the width of the cutaway portion of upper ramp 116 is just slightly less than the transverse spacing between the curved extensions 112 of lower ramp 110 in their raised position, left lower ramp 110, as it tends to fall downwardly by gravity, will engage the left side edge of upper ramp 116 which acts as a stop to preclude left lower ramp 110 from falling to its lower position and provides an abutment on its right side edge which would be engaged if the right lower ramp should have a tendency to fall due to being struck or because of high wind conditions.

When it is desired to return the ramps to their lower position, an operator pushes upwardly on counterweight 120 to lower upper ramp 116 whereupon left ramp 130 will fall by gravity to the position of FIGURE 9. Right ramp 130 is then manually moved from its overcenter raised position to the lower position of FIGURE 9.

In certain instances it is desirable to combine the features shown in the form of invention illustrated in FIGURES 1 and 9. Thus, ramps 130 of FIGURE 9 can be constructed as straight ramps, as in FIGURE 1, to overlie a transversely pivoted ramp.

For reasons discussed more fully below, in connection with the forms of invention shown in FIGURES 14–20, it may be desirable to decrease the vertical spacing between the upper and lower parking levels. The trend in later model cars is toward a lower profile. In the case of these later model cars the upper parking level may be appreciably lower than that necessary to permit all types of cars to park beneath the upper level. It has been found that, in the case of the lower profile cars, if the length $b$ of the upper level just exceeds the wheel base $d$ of these cars and the overall length of the support structure is made equal to two car lengths, straight drive-on ramps which do not exceed to critical agles $\alpha$, $\beta$ and $\gamma$ can be used. In such case, however, the rear portion of the elevated car would extend rearwardly beyond the rear edge of the upper level to overlie the upper ends of the inclined ramps and preclude their pivotal movement to the raised position. This problem is overcome by using a transversely pivoted ramp, such as shown at 116 in FIGURE 9, in conjunction with straight ramps and the method of operation would be the same as that described in connection with the embodiment of FIGURES 9 and 10.

Figure 12:
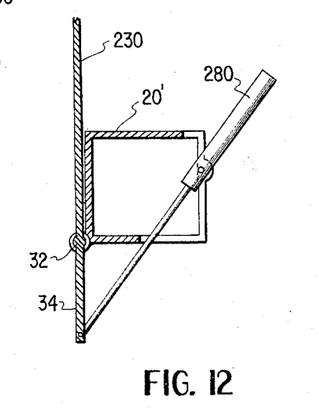
FIGURE 12 is a fragmentary showing of an actuating mechanism which may be used with the various forms of the invention.

It is, of course, obvious that power means such as illustrated in FIGURE 12, could be used to move the ramps shown in the various embodiments between their raised and lowered positions. In FIGURE 12 is fragmentarily shown a portion of one inclined support 20′ pivotally supporting an adjacent ramp 230 and the manner in which any suitable actuator, such as a hydraulic ram 280, could be related to provide the ramp movement about pivots 32.

Figure 13:
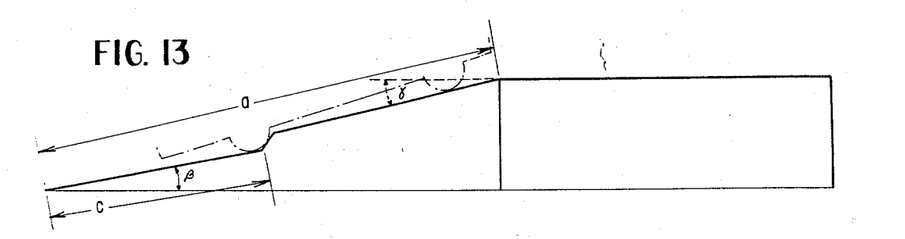
FIGURE 13 is a schematic representation of a further modified ramp configuration.
Figure 14:
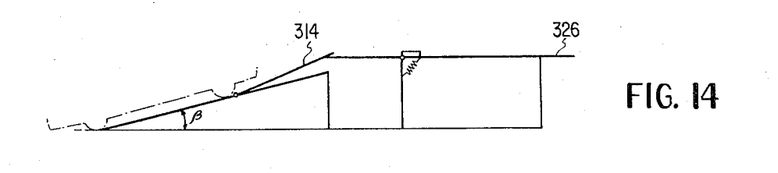
FIGURES 14 and 15 are schematic illustrations of a further modified form of the invention.
Figure 15:
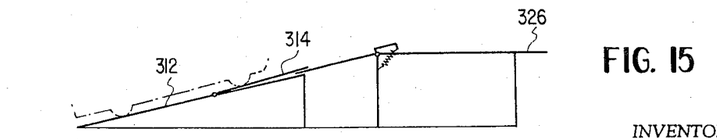

FIGURE 13 illustrates, schematically, another ramp configuration that may be utilized in a manner similar to that described in connection with FIGURE 8 to permit a car to traverse a shortened linear distance $a$ without exceeding the angles previously discussed.

Although it is possible to construct a drive-on approach ramp for an upper parking level in which the overall structure does not exceed two car lengths, as in the embodiments shown in FIGURES 8 through 13, these constructions lack the simplicity of the embodiment shown in FIGURE 1. For example, in the case of the FIGURE 9 embodiment, clearance must be maintained between adjacently positioned support structure 10′ to avoid interference between upwardly curved ramp extensions, on adjacent structures, when the ramps are in the raised position of FIGURE 10. Accordingly, where a plurality of automotive support structures are to be positioned side-by-side, as on a parking lot, it is desirable that the pivoted ramps be substantially planar throughout their length to avoid interference between the raised ramps of adjacent structures. If the support structure shown in FIGURES 1 and 2 is shortened so as not to exceed two car lengths and upper level 26 is lowered somewhat from the height shown in FIGURE 1, then it is possible to provide an upper level 26 which slightly exceeds the wheelbase of an automobile without exceeding angles $\alpha$, $\beta$ and $\gamma$. In such a construction, however, the rear end of a car parked on upper level 26 would extend rearwardly beyond the rear edge of the upper level and would prevent ramps 30 from being pivoted to the raised position because the ramps would engage the undersurface of the car before reaching their raised vertical position.

Figures 16, 17, 18:
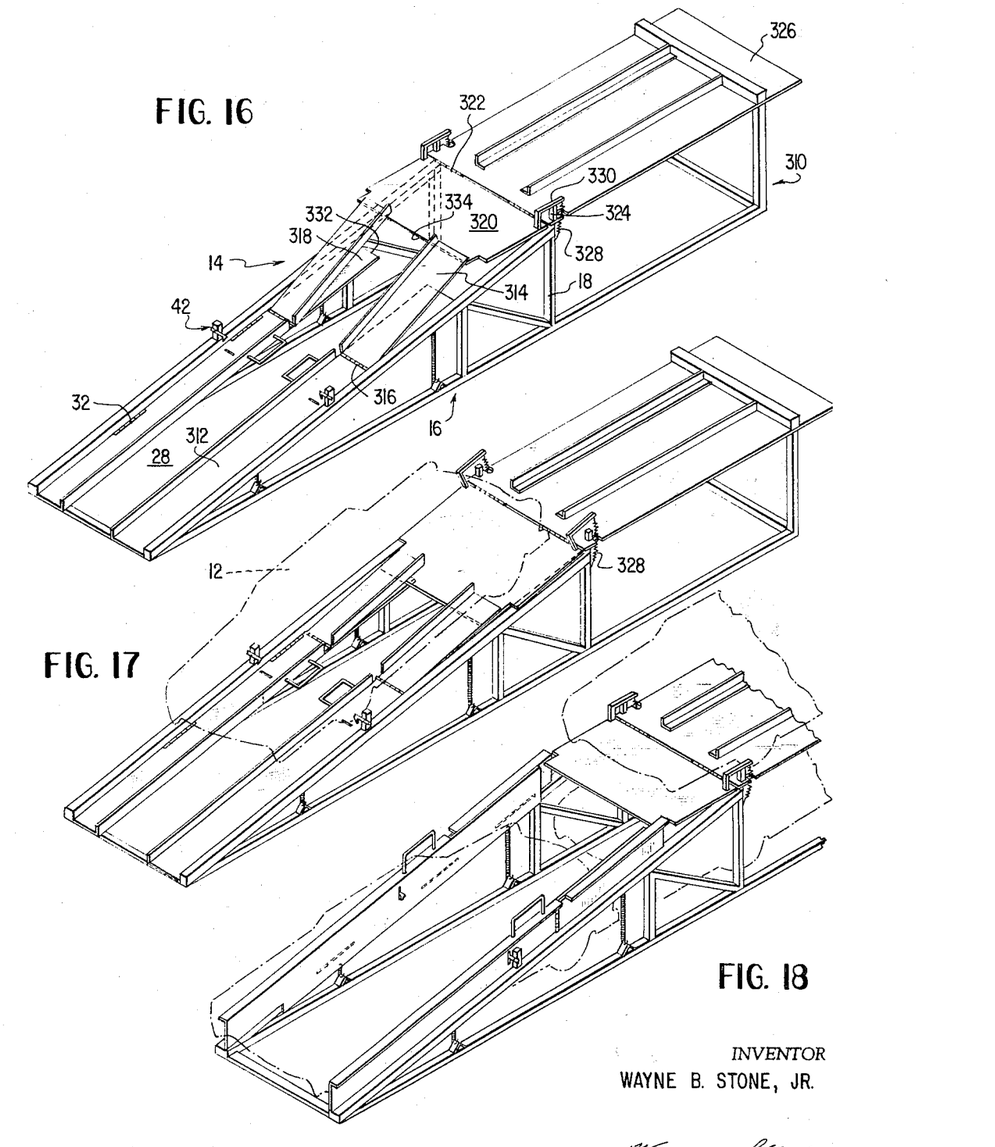
FIGURE 16 is a perspective view of an automotive support structure incorporating the principles schematically illustrated in FIGURES 14 and 15 and showing the various ramps in position for a car to be driven thereon.
FIGURE 17 is a view similar to FIGURE 16 showing the position of the ramps as a car is being driven thereover.
FIGURE 18 is a view similar to FIGURE 17 wherein the ramps have been moved transversely of the path of automotive movement of the lower cars indicated in phantom within the lateral confines of the structure.
Figure 19:
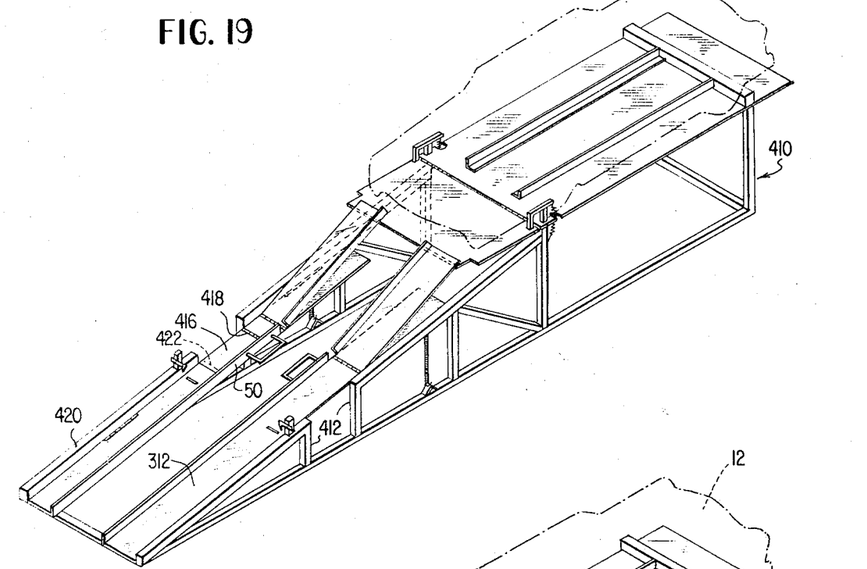
FIGURE 19 is a perspective view of a slightly modified version of the support structure shown in FIGURES 16-18.
Figure 20:
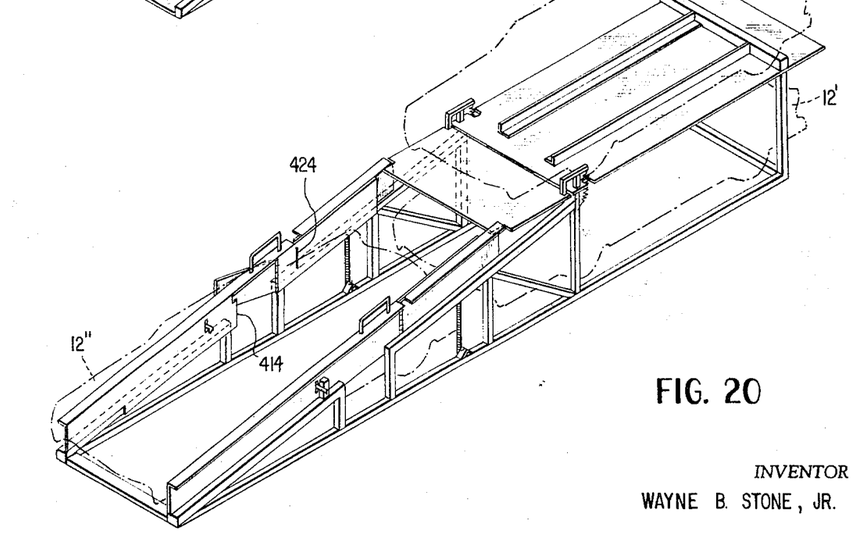
FIGURE 20 is a view similar to FIGURE 19 showing the ramps in raised position.

The form of the invention illustrated in FIGURES 14 through 20 overcomes these deficiencies and is especially adapted to facilitate a compact arrangement of multiple units such as that designated at 310 in FIGURES 16–18 and at 410 in FIGURES 19 and 20.

As shown in FIGURES 14–18, a pair of lower ramps 312 extend upwardly from lower parking level 28 at a desired angle $\beta$ and terminate short of upper level 326. A pair of intermediate ramps 314, pivotally mounted on lower ramps 312 by transverse pivots 316, overlie and extend beyond the upper ends 318 of the lower ramps to terminate short of upper level 326. Pivots 316 are provided with hinge stops which limit their opening movement to the position shown in FIGURE 16. An upper ramp 320, whose transverse width approximates that of upper lever 326, is pivotally supported adjacent the rear edge of upper level 326 for limited angular movement about a transverse axis defined by pivots 322 between the substantially horizontal position shown in FIGURE 16 and the downwardly inclined position of FIGURE 17. Upper ramp 320 is biased to the horizontal position against stop 324, shown in FIGURE 16, by a tension spring 328 interconnected between support member 18 and an integral extension 330 of the upper ramp extending across pivot axis 322. It will be noted that the upper ends of intermediate ramps 314 overlie the rear end of upper ramp 320 and that the rear end of upper ramp 320 ovelies the extreme upper ends of lower ramps 312. The reason for having the rear end of ramp 320 resting on the upper ends of lower ramps 312 is to provide additional support for ramp 320 although this overlapping relationship between the lower and upper ramps is not essential inasmuch as the necessary support for ramp 320 may be obtained from resting on inclined supports 20 when in the inclined position of FIGURE 17. When the overlapping relationship between ramps 312 and 320 is relied on, for additional support as in FIGURES 16–18, it is necessary that the amount of overlap be kept sufficiently small that the upper edge 332 of lower ramp end 318 will have clearance to pivot past the rear edge 334 of ramp 320 when that ramp is in its horizontal position of FIGURE 16 as ramps 312 and 314 are pivoted about the axis of pivots 32 to the position of FIGURE 18. Inasmuch as ramp 320 moves about transverse pivots 322 as an axis prior to the movement of ramps 312, the arc of movement undergone by edge 334 will remove it from the path of movement of edge 332 as ramps 312, 314 are pivoted about pivot axis 32 if the overlap between ramps 320 and 312 is kept sufficiently small. In contrast, the overlap between intermediate ramps 314 and upper ramp 320 is kept sufficiently large that rear edge 334 of upper ramp 320 always lies within the path of movement of those portions of intermediate ramps 314 extending beyond edge 332 of lower ramps 312.

The ramps of support structure 310 are normally in the position of FIGURE 16. As the front wheels of automobile 12 engage the lower ends of intermediate ramps 314, these ramps pivot downwardly under the weight of the car about their transverse pivots 316 and this movement is transmitted through the overlapping engagement between ramps 314 and 320 to upper ramp 320 to pivot the same downwardly about pivot axis 322 against the bias of spring 328 to the substantially planar ramp positions of FIGURE 17 where ramp 320 rests on the upper end 318 of lower ramp 312 and the upper end portions of inclined supports 20. Inasmuch as ramps 314 are only biased upwardly by spring 328 acting through upper ramp 320, the ramps remain in the position of FIGURE 17 until the rear wheels of car 12 have passed over ramp 320 onto upper level 326 at which time the ramps again assume the position of FIGURE 16 due to the bias of spring 328, pivoting ramp 320 out of the path of automotive movement between support means 14 and 16. Lower ramps 312 are then manually pivoted about the axes of pivots 32 to remove the lower ramps and intermediate ramps 314 carried thereon from the path of automotive movement between support means 14, 16. Lower ramps 312 are automatically latched in their raised position by latches 42, as previously described in connection with FIGURES 1–4. Intermediate ramps 314 will have a tendency to pivot outwardly away from ramps 312 as they are raised to the position of FIGURE 18. Inasmuch as their pivotal movement is limited to that shown in FIGURE 16, this tendency is not detrimental since the raising of lower and intermediate ramps on an immediately adjacent structure 310 would engage and force ramp 314 to reassume its substantially planar relationship with ramp 312. If desired, however, ramp 314 may be lightly spring biased to the position of FIGURE 17 provided that this spring bias is insufficient to overcome the bias of spring 328 in the FIGURE 16 position.

After movement of all the ramps 312, 314, 320 transversely of the path of automotive movement between support means 14, 16, two addition cars may be parked within the confines of structure 310 as illustrated in FIGURE 18.

In order to reposition the ramps so that the car on upper level 326 may back down, the rear car on lower parking level 28 is moved, latches 42 are released and lower ramps 312 pivoted downwardly about pivots 32. Since ramp 320 is in its raised position, upper edge 332 of ramp 312 clears rear edge 334 of ramp 320. As ramps 312 and their supported ramps 314 pivot downwardly, the undersurfaces of ramps 314 engage the upper rear edge of ramp 320 so that ramps 314 are cammed upwardly away from the plane of ramps 312 as ramps 312 continue their downward movement to the FIGURE 16 position.

To facilitate this opening movement of ramps 314 relative to ramps 312, it may be desirable to construct pivots 316 as loose pivots. In the event that it is desired to support ramp 320 wholly through its pivots 322 and on the upper surface of inclined supports 20 without relying on the additional support afforded by having ramp 320 overlap upper end 318, then end portion 318 may be made shorter and pivots 316 constructed as tight pivots since the lowering movement of ramps 312 and 314 would cam ramp 320 downwardly until the position of FIGURE 17 is reached whereupon the force vectors applied to pivots 316 would coincide with its direction of pivotal movement thereby enabling the bias of spring 328 to pivot ramps 320 and 314 to the position of FIGURE 16.

As automobile 12 starts to back down, the rear wheels force ramp 320 downwardly against the bias of spring 328 and ramps 314 collapse, as shown in FIGURE 17, under the influence of gravity to provide a substantially planar incline whose angles do not exceed those previously referred to as $\alpha$, $\beta$ and $\gamma$.

It is, of course, desirable to construct an automotive support structure of as small a width as possible to permit the side-by-side installation of multiple units in spaces no wider than those presently in use on conventional parking facilities. The limiting factor in constructing a support structure of the type herein disclosed of a width no greater than that normally used to park a car is the necessity of leaving sufficient room for an operator to open the car door. While an experienced operator can easily drive a car between the structural members supporting the ramps and upper level with a minimum of lateral clearance, it is necessary that sufficient clearance be provided on the left side of the car to open the door for easy entrance and exit.

FIGURES 19 and 20 illustrate an embodiment of the invention similar to that shown in FIGURES 16–18 but including additional means for facilitating opening the door of a car which is parked between the inclined ramps. FIGURES 19 and 20 differ from FIGURES 16–18 in providing a break 412 in the continuity of inclined supports 420 and cutting away a portion 414 of left lower ramp 312. It will be noted that the structural integrity of ramp 312 is maintained by virtue of the unbroken guide flange 50 extending past cutaway portion 414. An auxiliary ramp member 416, pivoted on a transverse axis 418, overlies cut-out portion 414 and is supported in the closed position of FIGURE 19 by an abutment 422 integral with ramp 312. A light spring load, which may be integrated with hinge 418, normally biases ramp 416 to the open position shown in FIGURE 20 when ramps 312 are in the raised position but is not sufficiently strong to open ramp 416 against the influence of gravity when ramps 312 are in the lower position of FIGURE 19.

After an automobile 12 has been parked on upper level 326, as described in connection with FIGURES 16–18, ramps 312, 314 and 320 are pivoted transversely with the path of automotive movement, as previously described, to the position of FIGURE 20, whereupon ramp 416 pivots outwardly through the cut-out portion 412 in left inclined support 420 and into the corresponding cut-out portion 412 in the right inclined support of an immediately adjacent support structure 410. A second car 12' is then parked beneath upper level 326 and since there are no support members in line with the car door in the embodiment of FIGURES 19 and 20, the operator can readily open the door in the space between car 12' and an immediately adjacent car parked beneath upper level 326 of an adjacent support structure 410. When the third car 12'' is parked between the inclined ramps, the operator stops at a designated position such as when abreast of a mark 424. The car door may then be opened outwardly through cut-away portion 414 in left ramp 312, cut-out portion 412 in the left inclined support and cut-out portion 412 in the right inclined support of an adjacent unit 410.

It is apparent that the use of springs, counter weights and power actuators are obvious equivalents in the various forms of the invention described. Similarly, it is obvious that the cutaway portions to facilitate door opening movement described in connection with FIGURES 19 and 20 could be equally advantageously applied to the other forms of the invention.

I claim:

1. In combination with an automotive support structure including transversely spaced support means extending upwardly from a lower generally horizontal support level to define a path of automotive movement therebetween and supporting an upper generally horizontal static support level in spaced superposed relation to a first portion of said path of automotive movement; the improvement comprising, ramp means defining a path of automotive wheel travel between said lower and upper levels, pivot means supporting said ramp means on said support structures for pivotal movement into and out of a second portion of said path of automotive movement, said pivot means defining at least a pair of inclined pivot axes spaced apart a distance exceeding the width of said path of automotive movement and positioned one on either side of said path of movement.

2. The support structure of claim 1 wherein said pivot means further define a horizontally disposed pivot axis.

3. The support structure of claim 2 wherein said ramp means extend through lower and upper zones respectively adjacent said lower and upper levels, said ramp means having generally planar upper surfaces in said lower zone and upper surfaces converging upwardly relative to said planar surfaces in said upper zone, said pivot means including at least two longitudinally inclined pivot axes extending into said lower and upper zones, and at least one horizontal pivot axis adjacent said upper zone.

4. The support structure of claim 1 wherein said ramp means consists of three ramps.

5. The support structure of claim 4 wherein said pivot means includes two transversely spaced longitudinally inclined pivot axes and one horizontally disposed transverse pivot axis.

6. The support structure of claim 1 in which said ramp means includes at least five ramps.

7. The support structure of claim 1 including counterbalancing means connected to said ramp means for biasing said ramp means for movement about said pivot means.

8. The support structure of claim 1 wherein one of said ramp means includes an opening therein, an auxiliary ramp, and means mounting said auxiliary ramp for movement between positions overlying and exposing said opening.

9. The support structure of claim 1 including power means interconnecting said ramp means and said support structure.

10. The support structure of claim 1 including means for locking said ramp means out of said second portion of said path of automotive movement.

11. The support structure of claim 1 wherein the upper surfaces of said ramp means extending through a lower zone adjacent said lower level are substantially planar and the upper surfaces of said ramp means extending through an upper zone adjacent said upper level are upwardly convergent relative to the planar surfaces of said lower zone.

12. The support structure of claim 1 wherein the upper surfaces of said ramp means extending through a lower zone adjacent said lower level are substantially planar and the upper surfaces of said ramp means extending through an upper zone adjacent said upper level include at least one portion upwardly inclined relative to the planar surfaces of said lower zone.

13. The support structure of claim 12 wherein said upper zone includes two angularly related surfaces, and each of said last-named surfaces are upwardly inclined relative to the planar surfaces of said lower zone.

14. The support structure of claim 1 including means interconnecting said ramp means and said support structure for biasing said ramp means for movement about said pivot means.

15. In combination with an automotive support structure including transversely spaced support means extending upwardly from a lower generally horizontal support level to define a path of automotive movement therebetween and supporting an upper generally horizontal static support level in spaced superposed relation to a first portion of said path of automotive movement; the improvement comprising, ramp means defining a path of automotive wheel travel between said lower and upper levels, pivot means supporting said ramp means on said support structure for pivotal movement into and out of a second portion of said path of automotive movement, said pivot means defining at least one inclined pivot axis lying outside said path of automotive movement and generally parallel to said path of wheel travel.

16. In an automotive support structure including transversely spaced support means extending upwardly from a lower support level defining a path of automotive movement therebetween and supporting an upper support level in spaced superposed relation to a portion of said path of movement; the improvement comprising, a pair of inclined ramps defining a path of automotive wheel travel between said lower and upper levels, pivot means interconnecting said support structure and ramps supporting said ramps for relative movement in arcuate paths between a substantially common inclined plane and generally vertical planes, said common inclined plane intersecting said path of movement and said generally vertical planes spaced apart a distance exceeding the width of said path of movement and lying one on either side thereof.

17. The support structure of claim 16 wherein the lower ends of said ramps engage said lower support level when said ramps are positioned in said common plane.

18. The support structure of claim 16 wherein the upper and lower ends of said ramps respectively engage said upper and lower support levels when positioned in said common inclined plane.

19. The support structure of claim 16 including means in addition to said pivot means for supporting said ramps in said common inclined plane and in said vertical planes.

20. In combination with a static automotive support structure including horizontally disposed base support means defining a lower support level, transversely spaced support means extending upwardly from said base support and defining a path of automotive movement therebetween, and an upper support level carried by said support means in spaced superposed relation to a first portion of said path of movement, the improvement comprising, a plurality of ramps extending between said lower and upper levels, and means mounting at least two of said ramps on said static support structure for movement relative to each other transverse of said path of movement into and out of a second portion of said path of automotive movement.

21. The support structure of claim 20 wherein said last-named means includes pivot means defining at least two longitudinally inclined pivot axes.

22. The support structure of claim 21 wherein said pivot means further includes pivot means defining at least one transverse pivot axis.

23. The support structure of claim 22 wherein two of said ramps are pivotally interconnected with two other of said ramps on transverse pivot axes.

24. The support structure of claim 20 wherein said plurality of ramps includes at least two pairs of ramps and said last-named means includes at least two transversely spaced pivot axes.

25. The support structure of claim 24 wherein at least two ramps are carried by each of said pivot axes.

26. The support structure of claim 25 wherein said last-named ramps are pivotally interconnected on a transverse pivot axis.

27. The support structure of claim 26 wherein the means mounting at least one of said plurality of ramps on said static support structure includes pivot means directly connected to said static support structure and defining a transverse pivot axis.

28. In an automotive support structure including transversely spaced support means extending upwardly from a support level defining a path of automotive movement therebetween and supporting an automotive support platform in spaced superposed relation to a portion of said path, the improvement comprising, inclined ramp means defining a path of automotive wheel travel between said support level and said platform, said ramp means including at least a pair of ramps, and mounting means interconnecting said support structure and said pair of ramps supporting the same for relative movement between a substantially common inclined plane and transversely spaced generally vertical planes.

29. In combination with an automotive support structure including transversely spaced support means extending upwardly from a lower generally horizontal support lever to define a path of automotive movement therebetween and supporting an upper generally horizontal support level in spaced superposed relation to a first portion of said path of automotive movement; the improvement comprising, first inclined ramp means extending upwardly from said lower level and terminating short of said upper level, first pivot means mounting said first ramp means on said support structure for movemenf into and out of a second portion of said path of movement, second inclined ramp means extending upwardly beyond the upper ends of said first ramp means, second pivot means mounting said second ramp means on said first ramp means for movement in vertical planes into and out of a third portion of said path of movement, third ramp means extending from said upper level toward said first ramp means, and third pivot means mounting said third ramp means on said support structure for movement in vertical planes into and out of a fourth portion of said path of movement.

30. The support structure of claim 29 wherein the upper ends of said second ramp means overlap the adjacent end of said third ramp means when the ramp means are disposed in said path of movement.

31. The support structure of claim 29 including stop means for limiting the pivotal movement of said ramp means between a first position of mutual substantially planar alignment disposed in said path of movement and a second position wherein each of said ramp means are angularly displaced from said first position.

32. The support structure of claim 29 wherein said first ramp means includes at least one opening therein, an auxiliary ramp, means mounting said auxiliary ramp on said first ramp means for movement between positions overlying and exposing said opening.

33. The support structure of claim 32 wherein said last-named means includes transverse pivot means.

34. The support structure of claim 33 wherein said spaced support means are relieved throughout those portions of their length in transverse alignment with said auxiliary ramp.

35. In combination with an automotive support structure including transversely spaced support means extending upwardly from a lower generally horizontal support level to define a path of automotive movement therebetween and supporting an upper generally horizontal support level in spaced superposed relation to a first portion of said path of automotive movement; the improvement comprising, first ramp means extending upwardly from said lower level and terminating short of said upper level, first pivot means mounting said first ramp means on said support structure for movement into and out of a second portion of said path of movement, second ramp means extending upwardly beyond the upper ends of said first ramp means, second pivot means mounting said second ramp means on said first ramp means for relative angular movement, third ramp means extending from said upper level toward said first ramp means, and third pivot means mounting said third ramp means for movement into and out of a third portion of said path of movement.

References Cited

UNITED STATES PATENTS

| | | | |
|---|---|---|---|
| 2,717,428 | 9/1955 | White | 52—175 |
| 2,730,400 | 1/1956 | Francis | 296—1 |
| 2,834,631 | 5/1958 | Taraldsen | 105—368 |

FRANK L. ABBOTT, *Primary Examiner.*

PRICE C. FAW, JR., *Assistant Examiner.*

U.S. Cl. X.R.

14—71; 214—16.1; 296—1

UNITED STATES PATENT OFFICE
CERTIFICATE OF CORRECTION

Patent No. 3,440,782                                                           April 29, 1969

Wayne B. Stone, Jr.

It is certified that error appears in the above identified patent and that said Letters Patent are hereby corrected as shown below:

In the heading to the printed specification, line 6, "Turner G. Moller" should read -- G. Turner Moller --. Column 1, line 39, "general" should read -- general, --. Column 2, line 47, "perspectivie" should read -- perspective --. Column 6, line 32, "ramp 110" should read -- ramps 110 --. Column 7, line 22, "structure 10'" should read -- structures 10' --; line 69, "ovelies" should read -- overlies --. Column 8, line 62, "addition" should read -- additional --. Column 9, line 56, "with" should read -- of --; line 59, "pivote" should read -- pivots --; line 63, "the" should read -- then --. Column 10, lines 17 and 18, "structures" should read -- structure --. Column 12, line 26, "lever" should read -- level --; line 33, "movemenf" should read -- movement --.

Signed and sealed this 3rd day of March 1970.

(SEAL)
Attest:

EDWARD M. FLETCHER, JR.                          WILLIAM E. SCHUYLER, JR.
Attesting Officer                                        Commissioner of Patents